US012392886B2

(12) United States Patent
Farah et al.

(10) Patent No.: US 12,392,886 B2
(45) Date of Patent: Aug. 19, 2025

(54) TRAJECTORY DETERMINATION SYSTEM USING POSITIONAL SENSING TO DETERMINE THE MOVEMENT OF PEOPLE OR OBJECTS

(71) Applicant: Density, Inc., San Francisco, CA (US)

(72) Inventors: Andrew Farah, San Francisco, CA (US); Casey Kelso, San Francisco, CA (US); Christian Ayerh, San Francisco, CA (US); John Shanley, San Francisco, CA (US); Robert Grazioli, San Francisco, CA (US); Benjamin Redfield, Rhineback, NY (US); Garrett Bastable, Fayetteville, NY (US); Brian Weinreich, Chappaqua, NY (US); Kyle Hay, Coto De Caza, CA (US)

(73) Assignee: Density, Inc., San Francisco, CA (US)

( * ) Notice: Subject to any disclaimer, the term of this patent is extended or adjusted under 35 U.S.C. 154(b) by 0 days.

(21) Appl. No.: 18/430,506

(22) Filed: Feb. 1, 2024

(65) Prior Publication Data

US 2025/0044437 A1 Feb. 6, 2025

Related U.S. Application Data

(63) Continuation of application No. 18/365,823, filed on Aug. 4, 2023, now Pat. No. 11,914,025.

(51) Int. Cl.
*G01S 13/72* (2006.01)
*G01S 7/35* (2006.01)

(52) U.S. Cl.
CPC .............. *G01S 13/72* (2013.01); *G01S 7/352* (2013.01)

(58) Field of Classification Search
CPC ................................. G01S 13/72; G01S 7/352
USPC .... 342/51, 146, 127, 356, 357.27, 419, 456, 342/69
See application file for complete search history.

(56) References Cited

U.S. PATENT DOCUMENTS

| 8,823,577 | B2 * | 9/2014 | Smid ........................ G01S 13/84 342/51 |
| 10,809,372 | B2 * | 10/2020 | Lomnitz .................. G01S 7/025 |
| 2004/0032363 | A1 * | 2/2004 | Schantz ................... G01S 11/06 342/146 |

* cited by examiner

*Primary Examiner* — Bo Fan
(74) *Attorney, Agent, or Firm* — Bryan L. Baysinger; Maynard Nexsen PC

(57) ABSTRACT

A plurality of positional sensing devices are situated at regular intervals within an environment and collect data for tracking objects moving within the environment. Phase shift of modulated Doppler pulses reflected from the sensing devices to objects are measured and converted into positional data indicating positions of detected objects within the environment. Associated timestamp data is also collected by the positional sensing devices. The positional data and associated timestamp data is aggregated from the plurality of positional sensors, and the aggregated positional data and is clustered to determine point clouds which are associated with the detected objects. The clusters are tracked by tracklets that track the position of each cluster over time. Trajectories for each detected object are determined by connecting tracklets together that are associated with the same detected object.

20 Claims, 9 Drawing Sheets

TRAJECTORY DETERMINATION SYSTEM USING POSITIONAL SENSING TO DETERMINE THE MOVEMENT OF PEOPLE OR OBJECTS

RELATED APPLICATIONS

This application is continuation of U.S. Non-Provisional application Ser. No. 18/365,823, entitled "TRAJECTORY DETERMINATION SYSTEM USING POSITIONAL SENSING TO DETERMINE THE MOVEMENT OF PEOPLE OR OBJECTS" and filed on Aug. 4, 2023, which is which is incorporated herein by reference. U.S. application Ser. No. 18/365,823 is related to U.S. Non-Provisional application Ser. No. 17/551,560, entitled "OCCUPANCY ANALYSIS SYSTEM USING DEPTH SENSING TO DETERMINE THE MOVEMENT OF PEOPLE OR OBJECTS" and filed on Dec. 15, 2021, which is incorporated herein by reference. U.S. application Ser. No. 17/551,560 claims priority to U.S. Non-Provisional application Ser. No. 16/844,749, entitled "OCCUPANCY ANALYSIS SYSTEM USING DEPTH SENSING TO DETERMINE THE MOVEMENT OF PEOPLE OR OBJECTS" and filed on Apr. 9, 2020, which is incorporated herein by reference. U.S. application Ser. No. 16/844,749 claims priority to U.S. Provisional Application No. 62/832,794, entitled "OCCUPANCY ANALYSIS SYSTEM USING DEPTH SENSING TO DETERMINE THE MOVEMENT OF PEOPLE OR OBJECTS" and filed on Apr. 11, 2019, which is incorporated herein by reference.

BACKGROUND

In modern society, large amounts of data are constantly being collected, revealing patterns and trends about human behavior that can be invaluable to businesses. Brick and mortar establishments (for instance, businesses) may have an interest in knowing the number of people that pass through their doors. Such data may be helpful in understanding their normal flow of business, identifying busier and quieter times, and evaluating the success of promotions or events, among many other things. Customers may also wish to know how busy a place is at a particular time, to predict their own wait time and avoid periods of high congestion without having to physically visit the space to observe its occupancy. Businesses may also wish to know trajectories of people visiting their establishment to better optimize the establishment's layout. However, as the amount and accuracy of collected data increases, so too does society's desire for privacy and security of personally-identifiable information. Therefore, an establishment's and its customers' desire for accurate people count data and trajectories conflicts with the wish to avoid overly invasive forms of surveillance.

Existing people counting solutions are insufficient to address this conflict. Human-performed, manual solutions, such as observational studies or tally-counting (with a clicker) require a dedicated human observer, cannot be performed at all times, and may be prone to error. Therefore, those solutions lack accuracy and scalability. Solutions implemented through other types of existing technology are similarly inadequate. While increased accuracy of counting can be obtained through, e.g., the use of optical cameras or badge/fob data (typically RFID), such methods of data collection create or rely upon repositories of personally-identifiable information, thereby sacrificing anonymity. Some technical solutions may offer increased privacy, through the use of, e.g., thermal cameras, motion sensors (passive infrared), break beam sensors, and the like, but once again sacrifice accuracy of results. For example, those existing anonymous solutions may have limited range of detection or may be unable to classify or identify objects as human (as compared to, e.g., animals or inorganic objects), leading to false positives. In some cases, these solutions may suffer from problems relating to depth of field, occlusion, and/or stereoscopic vision. Solutions implemented by third-party proxies, such as the aggregation of point-of-sale data, energy consumption tracking, or Wi-Fi MAC address tracking may be insufficiently imprecise, as they track only data tangential to people count and may also collect personally-identifiable information (device data). Further, solutions such as Wi-Fi MAC address tracking may be rendered inaccurate by MAC address randomization or other privacy protecting efforts used by device vendors.

Therefore, additional solutions to provide anonymous, accurate, real-time people counting and trajectory are generally desired.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1A:
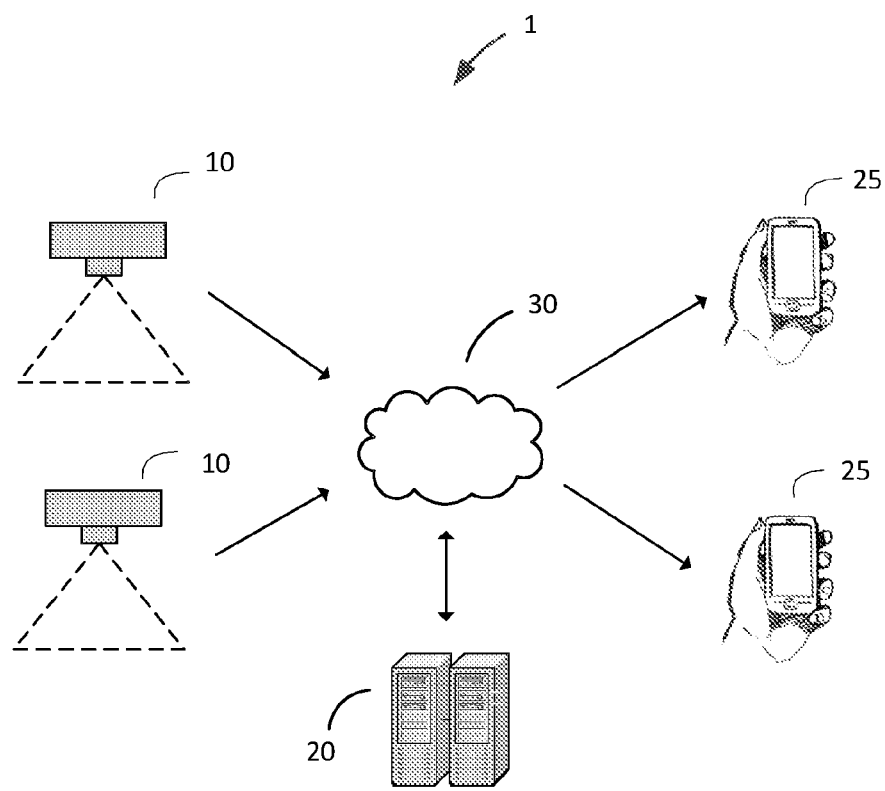
FIG. 1A is a block diagram of a positional sensing system in which a positional sensing device can be used in accordance with some embodiments of the present disclosure.

A depth sensing device may be used to recognize the movement of objects through a doorway or within an open space. In one embodiment, a plurality of devices are positioned throughout a floorplan of a building. Each device can be configured to emit a pulses, such as Doppler pulses. The pulses reflect off the various surfaces of the environment, and a phase shift of the emitted pulses is detected by sensors of each device. The changes in the phase shift data over time can be used to generate privacy-friendly positional data for moving objects within the environment. The sensors of each device can also detect a change in amplitude in the emitted pulses reflected off the various surfaces of the environment. For example, the sensors can use the detected change in amplitude to determine the size of an object traveling through the environment. In this regard, when the change in amplitude indicates that the object is too small to be associated with an object of interest, such as a human (e.g., when the change in amplitude is sufficiently large), the system can filter out phase shift data that is associated with the small object.

The plurality of sensors can collect timestamp data that identifies the time that each data point of the phase shift and/or amplitude change data was collected. The phase data and the timestamp data from the plurality of devices can be sent to a server to generate tracking data that identifies the trajectory of objects within the environment over time. Typically, the tracking data is accompanied by information sufficient to uniquely identify the device, such as a device name or ID, a network ID, a MAC address, or the like. This tracking data can additionally be used to determine occupancy within the environment in real time.

In some embodiments, moving objects identified in the positional data may be classified as one or more human subjects, while retaining the anonymity of the subjects' identity. In some embodiments, additional sensors may be used, such as the depth sensor previously described in U.S. Non-Provisional application Ser. Nos. 17/551,560 and 16/844,749 to identify when objects cross a threshold, such as a doorway of an environment.

In some embodiments, the positional data from the plurality of sensors is aggregated by the server. The server can include a first module that is configured to cluster the positional data into one or more clusters for each point of time as indicated by the timestamp data. Each cluster can be identified as a unique object within the environment by the first module of the server. The server can also include a second module. The second module can include logic that is configured to generate what is referred to herein as "tracklets" that track the change in position of the clusters over time based on the positional data. The server can also include a third module that includes logic that is configured to determine a trajectory for each of the one or more detected objects indicated by the clusters by connecting tracklets together that are associated with the same detected object.

In some embodiments, a processor of the server may utilize one or more algorithms to determine which clusters of positional data to connect together to form trajectories for unique objects detected within the environment. For example, the processor may include logic configured to connect tracklets together based on a reward function that selects the tracklets that are most likely associated with the same object.

In some embodiments, the server may utilize different algorithms for tracking trajectories of objects depending on the objects speed of travel. For example, the server can utilize a first reward function that is optimized for tracking moving objects and a second reward function optimized for tracking relatively static objects. Accordingly, the second module may utilize the first reward function to generate tracklets, and the third module may utilize the second reward function to connect tracklets that the server determines are associated with the same object.

In some embodiments, the server may be configured to store a map of the environment and the one or more proximity sensors within the environment. For example, each of the one or more proximity sensors may be assigned respective coordinates within the map of the environment. Based upon the coordinates, the server may include logic that merges the captured positional data from each of the plurality of positional sensors to form the tracklets that track the trajectory of objects within the environment.

In some embodiments, the server may be configured to generate trajectories for the detected objects in substantially real-time. In other embodiments, the server may be configured to use historical data in order to increase the accuracy of the determined trajectories of objects within the environment. For example, the server may aggregate positional data and associated timestamp data. The positional data can be chunked into discrete time portions, which can be times portions on the order of several seconds, a minute, several minutes, an hour, etc. The reward function logic can be configured to select for trajectories that align the known positions of an object across the discrete time portions to increase the accuracy of the determined trajectories.

In some embodiments, the trajectories may be used by the system to determine occupancy metrics. The occupancy metrics are made available for inspection through an API. As described above, data from several devices, positioned at different locations may be aggregated together to determine an accurate people count within the environment.

In another embodiment, in addition to positional data, the positional sensing device may collect and transmit data about the health or status of the device. In some embodiments, the device may also collect external ambient data. For example, the device may include an accelerometer that tracks vibrations (such as door slams) even where no visual effect can be seen. In another embodiment, the device may include an ambient light sensor to track lighting within or of the space. The various collected information may be provided to an external server for analysis.

In one embodiment, the positional data is processed by the server so as to be analyzed at various granularities of physical and logical space. These may be understood as virtual spaces that exist within a hierarchy of perception, such that positions of objects (e.g., people) may be tracked within a nested set of geographic spaces, such as a room, a floor, a building, or a campus, and/or logical spaces, such as an organizational grouping (e.g. a department or set of people) or a non-contiguous subset of rooms or geographic spaces. In one embodiment, the count data is distributed to one more users via an API so as to be accessible from a mobile or other computing device, and may be filtered upon or otherwise manipulated at the level of different virtual spaces.

FIG. 1A depicts an illustrative block diagram of a positional sensing system 1 in accordance with some embodiments. As illustrated, a positional sensing system 1 includes a plurality of positional sensing devices 10, each monitoring a separate or overlapping physical space, one or more remote servers 20, a network 30, and one or more mobile devices (such as a mobile phone or iPad) or alternate computing devices (such as a mobile device or PC) 25. Network 30 may comprise one or more network types, e.g., a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network or any combination thereof. In some embodiments, the network 30 may be the Internet and information may be communicated between system components in an encrypted format via a transport layer security (TLS) or secure socket layer (SSL) protocol. In addition, when the network 130 is the Internet, the components of the positional sensing system 1 may use the transmission control protocol/Internet protocol (TCP/IP) for communication.

In an exemplary embodiment, remote server 20 may include one or more servers operated and managed by a single entity, however, in other embodiments, processing may be distributed between multiple entities at different geographic locations. In still other embodiments, remote server 20 need not actually be physically or logically "remote" to the positional sensing devices 10, and the processing may instead be performed at a server or share (whether dedicated or not) connected by a local area network.

In an exemplary embodiment, the components of the positional sensing system 1 facilitate the collection of positional data based on a Doppler shift of microwave radiation that is emitted from a pulse emitter of each positional sensing device 10 and reflected from objects within the environment. The positional data is then provided to the remote server 20, and remote server 20 aggregates the positional data from all the positional sensing devices and converts the positional data into trajectory data for one or more objects within the environment. In some examples, the server identifies which of the one or more detected objects are associated with humans within the environment prior to converting the positional data into trajectory data. The trajectory data can be used to determine anonymous people count data over time within the environment. The components of the positional sensing system may also facilitate the access and display of the trajectory data and anonymous people count data by mobile device 25.

Figure 1B:
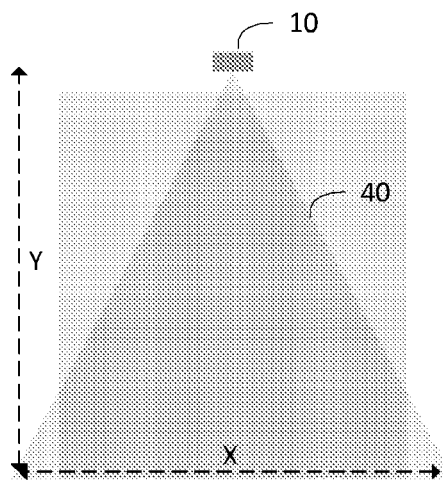
FIG. 1B depicts the placement of a positional sensing device in accordance with some embodiments of the present disclosure.

FIG. 1B is a diagram showing the placement of an exemplary depth sensing device 10. Device 10 is typically configured for indoor installation, however, in alternate implementations, the device may be used in outdoor or partially outdoor conditions (e.g., over a gate or open air tent). In general, however, the device 10 may be understood to be situated in regular intervals within an indoor space such as rooms, offices, cafes, bars, restaurants, bathrooms, retail entrances, book stores, fitness centers, libraries, museums, and churches, among many other types of facilities. The positioning of the device 10 may be selected to balance the need for a sufficiently large field of view 40 while allowing for some overlap within the field of view 40 of adjacent devices 10. As illustrated in FIG. 1B, device 10 is situated so as to have a field of view 40 with a maximum width X and a maximum length Y. In some embodiments, one or more devices 10 may be arranged from the ceiling (or another elevated point) within an open space of an environment to track the change in position of moving objects (e.g., people) within the bounds of a set physical space. As one example, at a retail space or convention space, a device 10 could be positioned above an area of interest (e.g., where a new product is located) to gauge interest by the number of people who enter the bounded area, though of course many other applications are possible.

Figure 2A:
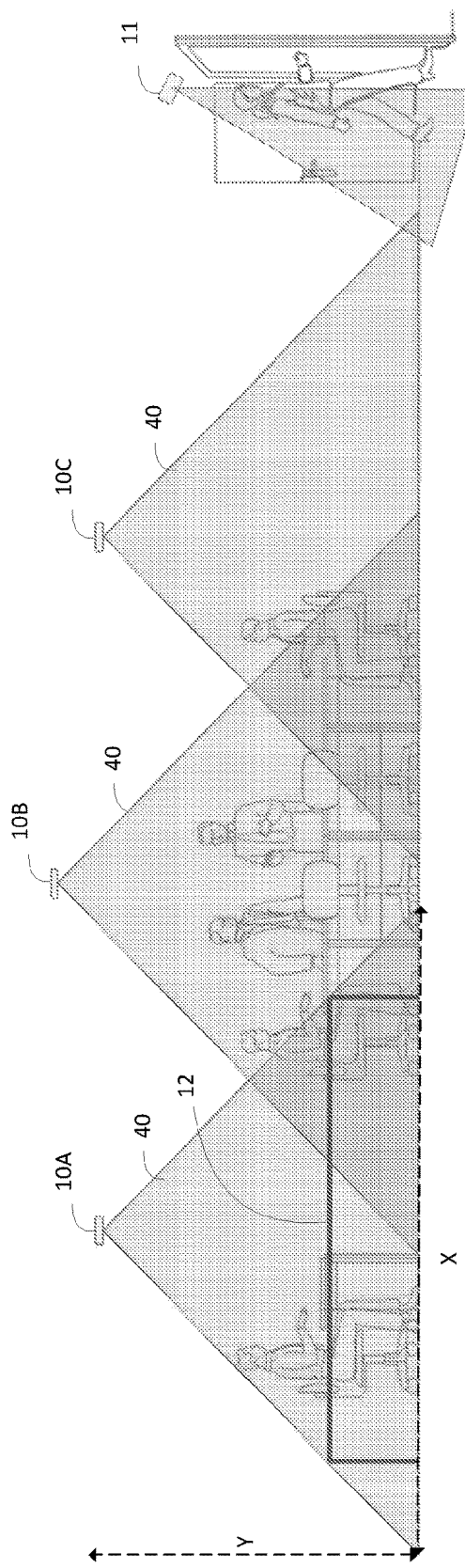
FIG. 2A depicts the placement of a plurality of positional sensing devices in accordance with some embodiments of the present disclosure.
Figure 2B:
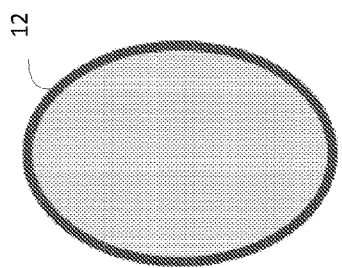
FIG. 2B depicts a cross sectional area monitored by a positional sensing device in accordance with some embodiments of the present disclosure.

FIG. 2A depicts the placement of a plurality of positional sensing devices in accordance with some embodiments of the present disclosure. FIG. 2A shows a plurality of positional sensing devices 10A, 10B, and 10C placed with overlapping field of view 40 such that the field of view 40 of positional sensing device 10A overlaps with positional sensing device 10B and the field of view 40 of positional sensing device 10B overlaps with field of view 40 of positional sensing device 10C. FIG. 2A also shows a depth sensing device 11 as described in related U.S. patent application Ser. Nos. 17/551,560 and 16/844,749, which may be used in tandem with positional sensing devices 10 to improve the accuracy of people count data determined by the positional sensing system 1. In some embodiments, the depth sensing device 11 may be replaced with another positional sensing device 10 which can be configured to track the movement of objects through doorways or thresholds. As shown field of view 40 of positional sensing device 10A can include a cross section area 12 that is monitored by positional sensing device 10A. The cross sectional area 12 is better seen in FIG. 2B, which shows that the cross sectional area 12, as viewed from the perspective of the positional sensing device 10A, can take the form of an ellipse or circular shape. In this respect, a positional sensing device can accurately monitor the movement of an object anywhere within the cross sectional area 12 depicted in FIG. 12B. While each positional sensing device 10A can monitor objects anywhere within the field of view 40, tracking is most accurate within the cross section area 12. For this reason, in certain embodiments, the positional sensing devices 10 are placed such that the fields of view 40 are at least partially overlapping, as shown in FIG. 2A.

Figure 3:
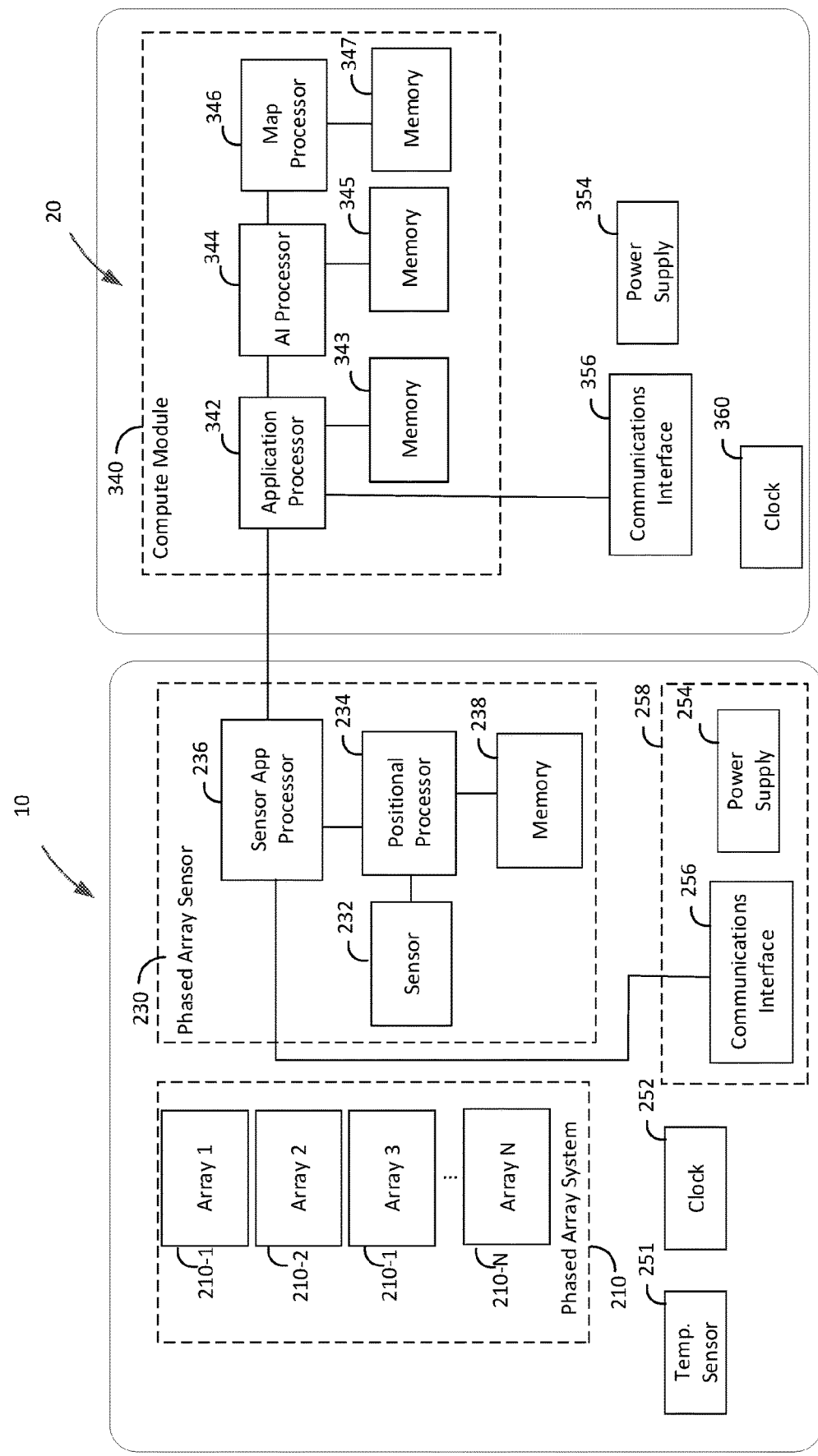
FIG. 3 is a diagram of certain component parts of a positional sensing device and remote server, in accordance with some embodiments of the present disclosure.

FIG. 3 illustrates an example schematic diagram of components of an exemplary positional sensing device 10 and server 20. Positional sensing device 10 includes a phased array system 210 and a depth sensor 230. The server can include a compute module 340. The various components of modules 210, 230, and 340 may be interconnected and may communicate with and/or drive other modules via one or more local interfaces (not shown), which may include at least one communication bus. However, any practical configuration of the illustrated components may be used, and the components need not fall into the particular logical groupings illustrated in FIG. 3. Further, It will be understood that the architectures described below and illustrated in FIG. 3 are not limited to the components discussed herein, and may include other hardware and software components. Rather, for ease of explanation, only the components and functionalities most relevant to the subject systems and methods are discussed herein.

Device 10 and server 20 can include a number of processors that may execute instructions stored in a corresponding memory to control the functionalities of the respective device or server. Typically, these processors (positional processor 234 sensor app processor 236, application processor 342, and AI processor 344, described below) may include, for example, one or more of central processing units (CPU), digital signal processors (DSP), graphics processing units (GPU), application-specific integrated circuits (ASICs), field-programmable gate arrays (FPGAs), and/or microprocessors programmed with software or firmware, or other types of circuits for performing the described functionalities (described further herein), or any combination thereof. As used herein, memory may refer to any suitable storage medium such as disks, thumb drives, etc., both volatile and non-volatile. Examples of such media include RAM, ROM, EEPROM, SRAM, flash memory, or any other tangible or non-transitory medium that stores information that is accessible by a processor. Different embodiments may have components with differing capabilities, so long as the amount of RAM is sufficient to support reading sensor data and running analysis algorithms as described herein, and running all necessary supporting software.

FIG. 3 illustrates four phased arrays, labeled as elements 210-1, 210-2, 210-3, and 210-N, which make up an exemplary phased array system 210. These phased arrays are, in an exemplary embodiment, phased Doppler radar arrays that monitor an area within the environment. Although only four phased arrays are shown, it should be understood that each positional sensing device 10 can have any number of phase arrays, up to an arbitrary number "N" of arrays within the phased array system 210. The phased array system 210 can be configured to such that each element 210-1, 210-2, 210-3, etc. is spaced apart in regular intervals such that the pulses emitted by these elements superimpose to form beams that increase power radiated in desired directions and suppress radiation in undesired directions. In certain embodiments, the phase array system 210 can be implemented as a sparse phased array, in which certain phased array elements are omitted from the phased array system 210. For example, element 210-2 may be omitted such that the spacing between element 210-1 and element 210-3 is approximately twice the spacing between element 210-3 and 210-4. Sparse phased arrays may be used in order to reduce cost and/or energy requirements of the phased array system 210. As the beams transmitted from these phase arrays is reflected, the reflections are sensed by sensor 232. Sensor 232, in some embodiments, may be a Doppler radar sensor. Phased array sensor 230 may also include a positional processor 234 and a sensor app processor 236 that generate positional data from the sensed data and may perform a variety of processing, such as noise reduction. These processing elements may execute instructions stored in, and may variously read/write to, a memory 238, which may include a combination of temporary storage (for sensed data) and permanent storage (for operational software and the like).

Compute module 340 of server 20 generally handles the processing of data generated by the phased array sensor 230. In addition to the application processor 342, compute module 340 includes an AI processor 344 for analysis and classification of the positional data, and map processor 346 for storing map data associated with the environment of the positional sensing devices 10 and the respective positions of each positional sensing devices 10 within positional sensing system 1. The processors 342, 344, and 346 may respectively execute instructions, stored in, and read/write to, memories 343, 345, and 347, respectively, which may include a combination of temporary storage and permanent storage.

While the terms "positional sensor" and "positional sensing" are used in this disclosure, the devices 10 are not meant to be so limited, and other embodiments may exist where a device 10 uses sensing methods other than positional sensing to determine the movement of objects through a monitored space. For instance, in alternative embodiments, device 10 may have one or more other types of sensors capable of imaging or monitoring an area within an enclosed space, these sensors being used to in addition to or as an alternate to phased array sensor 230 and/or positional sensor. By way of example, in some embodiments, device 10 may utilize a LIDAR sensor and/or any other known type of sensor(s) so long as the sensor(s) are capable of fitting and operating within the device 10. The sensed data from these various sensors may in various embodiments be collected, additionally or alternatively to, the data from the phased array sensor 230. The general principles described herein are agnostic to the particular technique used to collect data about the monitored area. While embodiments may exist where device 10 does not collect (or is not limited to collecting) positional data or convert sensed positional data into trajectories of objects, an exemplary device may still be referred to herein as a "positional sensing device" for ease of explanation.

Positional sensing device 10 may additionally include a communication interface 256 with one or more interfaces for wireless communication (e.g., Wi-Fi or Bluetooth antennas) and/or a wired communication interface. In addition, the device may have a power supply 254 providing a physical connection to AC power or DC power (including power conversion circuitry). While FIG. 2 illustrates communication interface 256 and power supply 254 as two separate components, in exemplary embodiments, a single Power Over Ethernet (PoE) system 258 (e.g., PoE 802.3af—2003 or 802.3at—2009, though any appropriate standard may be used) may be used to provide both functions, the PoE system receiving electric power along with data through a physical interface, such as an RJ45 connector or similar. Device 10 is designed to be constantly powered, so as to always be in a ready state to recognize and capture event data, and therefore, the device relies primarily on a continuous power connection (PoE). However, in some embodiments, device 10 may have a battery (not specifically shown) to provide backup power, in the case of a power outage or mechanical failure of the PoE/power supply component. Device 10 may include a USB interface into which a peripheral (e.g., to provide Bluetooth or network connection or other functionality) may be inserted. In addition, the device may include one or more LEDs (not specifically shown) that indicate a power and/or functional status of the device. Communication through the communication interface 256 may be managed by the sensor app processor 236.

Similarly as described with respect to positional sensing device 10, sever 20 can include a communications interface 356 and power supply 354. The communication interface 356 can include one or more interfaces for wireless communication (e.g., Wi-Fi or Bluetooth antennas) and/or a wired communication interface. Power supply 354 may provide a physical connection to AC power or DC power (including power conversion circuitry).

Device 10 may also include a variety of components configured to capture operation and/or telemetry data about the device 10. The device 10 may include one or more temperature sensors 251 capable of sensing an internal temperature and/or an internal humidity measurement of the device to ensure that such conditions are within functional bounds. In addition, the device 10 may include a clock component 252 that may be used to measure a time (timestamp) of data capture and may also be used in the scheduling of operations by the positional processor 234, e.g., reporting, resetting, and/or data capture operations. In an exemplary embodiment, a timestamp of data capture is collected with a high degree of specificity, typically a fraction of a second.

Similarly as described with respect to positional sensing device 10, sever 20 can include a clock component 360 that may be used to measure a time (timestamp) of data capture and may also be used by the server when aggregating positional data received from one or more positional sensing devices 10 and determining trajectories of objects detected by the one or more positional sensing devices 10.

While FIG. 3 illustrates application processor 342, AI processor 344, and map processor 346 as being separate processing elements, in alternative embodiments, the functionalities of these processors may be implemented within a single processing element or distributed over several components. Similarly, positional processor 234 and sensor app processor 236 may be implemented as separate processors or within one or more processing elements, in any appropriate configuration. Processors 234, 236, 342, 344, and 346 may be respectively implemented by any type of suitable processor and may include hardware, software, memory, and circuitry (or any combination thereof). In one embodiment, these processors may be implemented as two logical parts on a single chip, such as a custom ASIC or field-programmed gate array (FPGA). In one exemplary implementation, positional processor 234 is a Doppler ASIC, while the remaining processors are implemented as one or more CPUs. In some embodiments, application processor 342 is a High-Level OS processor (e.g., Linux). Other configurations are possible in other embodiments. Positional sensing device 10 may have other types of suitable processor(s) and may include hardware, software, memory, and circuitry (or any combination thereof) as is necessary to perform and control the functions of positional sensing device 10. In some embodiments, positional sensing device 10 may have multiple independent processing units, for example a multi-core processor or other similar component.

As described above, device 10 can be installed at regular intervals throughout the environment such that the field of view 40 of the devices 10 in aggregate cover all or nearly all the desired area to be monitored, although in some embodiments, device 10 can be placed at irregular intervals so long as at least one device 10 has a field of view 40 that covers the desired area to be monitored. Each device 10 can include a phased array system 210, which can be a Doppler array, and a phased array sensor 230. The phased array sensor 230 is configured to detect pulses that are reflected off the environment and objects, such as humans, moving throughout the environment. Using the reflected pulses, the positional processor 234 can determine, for each point in time, phase data identifying features of objects within the environment.

The sensor 232 passes its collected data to positional processor 234. Positional processor 234 uses Doppler technology to measure, from the collected data, the phase shift and/or the amplitude change of modulated Doppler pulses reflected from the object back to the sensor 232. The process from generating pulses to the generation of positional data is referred to herein as the data capture, the data capture process resulting from a single frame of data. Scheduling of a data capture is controlled by the positional processor 234. Once the positional processor 234 initiates a data capture and the Doppler pulse is reflected back to the sensor 232, the positional processor 234 collects the captured data from the sensor, correlates the collected data to the timing of the capture (with reference to clock 252), and calculates the positional data. As described above, in certain embodiments, when the amplitude change indicates that an object is smaller than a predetermined threshold (e.g., when the amplitude change is sufficiently large), the phase shift data for the small object may be filtered out before the positional data is calculated. The positional data will then be transmitted to the compute module 340, which aggregates positional data from each positional sensing device 10 for detected objects throughout the entire environment being monitored. While, in the exemplary embodiment of FIG. 3, the hardware of the positional processor 234 performs the positional data calculations, other embodiments may offload such computation to a dedicated processor or chip (not shown), or to server 20.

Sensor app processor 236 may be, in one embodiment, implemented as a microprocessor. The sensor app processor 236 performs a variety of tasks in support of the depth processor 234 as well as the entire device 10. Initially, the sensor app processor may control power management and firmware/software management (e.g., firmware updates). In addition, sensor app processor 236 may convert the phase data generated by the positional processor 234 so that it may be further processed in the compute module 340. For instance, the Doppler data (phase data) transmitted from the depth processor may be converted from a low-voltage differential signal (LVDS) to a wireless signal or USB signal, and additional processing may be done to, e.g., reduce noise in the data. The sensor app processor 236 may also be configured to transmit the positional data generated based on the phase data to the compute module 340 for further processing.

In some embodiments, the sensor app processor 236 may control management of the environmental conditions of the device 10, to ensure that the temperature and power conditions of the device are within the boundaries of acceptable limitations. Temperature sensor(s) 251 may be used to measure ambient and operating temperatures. In an exemplary embodiment, the operating temperatures may range, e.g., from approximately 0° C. to 35° C. (ambient), 0° C. to 60° C. (maximum at enclosure case), 0° C. to 85° C. (internal), and −10° C. to 85° C. (storage), though other ranges may be possible in other embodiments. Similarly, humidity conditions may range, in one embodiment, from approximately 5% to 95% non-condensing and from 20% to 80% non-condensing at minimum.

The positional data and associated timestamp data is sent by the sensor app processor 236 to the compute module 340, and particularly, to an application processor 342. Compute module 340 may include application processor 342, AI processor 344, and map processor 346. In general, compute module converts the positional data to a cluster of points associated with a features of an object, herein referred to as "point cloud data." For example, the point cloud data could be associated with the motion of an arm while a human subject is sitting within a chair, or the motion of the legs or torso of a human as the human walks through the environment. Points that appear close in coordinate (X, Y) space and in time can be associated with the same point cloud. Point clouds can be understood to be associated with a particular object (e.g., human) moving throughout the environment. Rather than continuous capture (as a video or timed image capture would do), the phase data may captured asynchronously by sensor 232 as objects are sensed. Put another way, only "movement data" of the person or object is tracked. While different frame rates and/or resolutions may be used in different embodiments, it will be generally understood that the frame rate should be fast enough to allow tracking of a person or object, rather than a single frame in which their direction of movement cannot be determined. Alternatively, in some embodiments, data streamed from the sensor to the application processor 342 can take the form of a 3-D point cloud with a time integration component, such that the 3-D point cloud is streamed over time. The streamed point cloud data may be considered cumulatively, with a time constant for integration of data across frames or sub-frames. Data streamed to the AI processor 344 for classification may include a point cloud stream along with Doppler data and/or other signs of life metrics. The AI processor can implement an AI-model based on one or more sets of point cloud image training data. The output of the AI processor 344 may, in one embodiment, be is fused with output from a Bayesian inference engine by a Kahlman filter.

Compute module 340 can aggregate point cloud data from each positional sensing device 10 in order to determine positions of objects for a given point in time, as indicated by the timestamp data. As objects move throughout the environment, compute module 340 can utilize AI algorithms that determine the trajectory of each object by connecting point clouds together over time (e.g., for each collection of point cloud data associated with a respective timestamp), which may be referred to herein as determining a trajectory for an object. For example, the compute module 340 can utilize one or more reward functions that can determine which point clouds across different timestamps are associated with a particular object. In some embodiments, a first reward functions can be configured to connect point clouds that are moving over time (e.g., a walking person) and a second reward function can be configured to connect point clouds that remain relatively stationary over time (e.g., a person sitting down at a desk). The process of connecting point cloud data together will be discussed in more detail with respect to FIG. 7, below. Compute module 340 can also use the determined trajectories to determine count data that represents the number of people within a given area or space being monitored within the environment (e.g., such as a specific room, a collection of rooms, or a predefined area of interest). This data retains anonymity of identity, as it is not personally identifiable to any person, and instead, directed merely to their movement into or out of a space.

Application processor 342 receives the positional data of the monitored area from the sensor app processor 236 and converts that data to point cloud data. The conversion of positional data to point cloud data may be done through any known calculation. Application processor 342 then sends that generated point cloud data to the AI processor 344. The AI processor 344 algorithmically discerns people, and their direction of movement, from other objects in the depth data. In one embodiment, the AI processor uses an on-board machine learning algorithm to classify objects within a frame as human. By combining different clusters of points, each with respective heights, AI processor 344 is able to identify the shape of a detected object and can classify these objects as people. In one embodiment, the algorithm implemented by the AI processor may recognize a cluster of points as a head, or shoulders. By tracking the movement of that group of pixels within a sequence of frames, the AI processor may track the position of the human subject. In other embodiments, the AI processor may be additionally or alternately capable of identifying other objects, such as animals, objects, furniture or barriers, or other organic and non-organic movement. The AI processor 344 also includes logic for connecting point clouds together over time into a trajectory for a detected moving object. In some examples the AI processor 344 can include a first reward functions that can be configured to connect point clouds that are moving over time (e.g., a walking person) and a second reward function can be configured to connect point clouds that remain relatively stationary over time (e.g., a person sitting down at a desk). As such, the AI processor 344 is able to determine when an object remains relatively stationary for long periods of time within a monitored area, and the same object transitions to moving across the monitored area by using both the first reward function for detecting moving objects and the second reward function for detecting relatively stationary objects.

In the exemplary embodiment, the identification of humans is performed on top of the generated point cloud data, and is not based on image classification from an optical camera (e.g., facial recognition), thermal camera, or other similar means. However, in alternative embodiments, data from optical/thermal cameras, RFID, other sensors, and/or other techniques for detecting humans may be considered in addition to, or alternate to, the depth data in the identification of people. In some embodiments, the AI processor 344 improves the point cloud data before classification, for example by processing the point cloud data to improve the signal to noise ratio. In other embodiments, these activities may be performed by the application processor 342, or not at all. In some embodiments, the classification of objects is split between the application processor 342 and the AI processor 344. This may be most useful in embodiments where one of the processors is configured to be particularly efficient at a certain type of task. As one example, AI processor 344 may be structured to expediently perform matrix multiplication, while application processor 342 may expediently perform tracking of a shape. The strengths of the relative components of compute module 340 are therefore exploited through distribution of processing to enhance the speed of computation and reduce latency in generating count data. Because the phase data, positional data, and point cloud data do not reveal the identity of people being monitored, no personally-identifiable data is captured or stored by the positional sensing system 1.

The positional data generated by the AI processor 344 is aggregated for each positional sensing device 10 by the map processor 346, which stores a map 400 (discussed below) which includes data regarding the XY coordinate position of each positional sensing device 10, as well as features within the environment, such as objects that may occlude a tracked object from being monitored by a respective positional sensing device 10. The positional data may be correlated to XY coordinates which are associated with the map 400 stored by the processor 346. Additionally, features stored in map 400 may be utilized in order to filter out spurious positional data, for example when a positional sensor incorrectly detects an object that is attributable to a reflection of a pulse from an occluding wall (as described in more detail with respect to FIGS. 5 and 6). In an environment utilizing multiple positional sensing devices 10, map processor 346 may be configured to aggregate and reconcile data collected from each of the multiple positional sensing devices. That is, for an environment with multiple positional sensing devices 10, the server 20 will consolidate information from the multiple positional sensing devices 10 to generate aggregated positional data that accurately identifies each object within the monitored area. This aggregation and reconciliation is performed by map processor 346 at the remote server 20. It is generally noted that while the server 20 is referred to as a "remote" server, the functions of the server 20 need not necessarily be performed on a system physically remote to the device 10. Rather, in alternative embodiments, the functions described herein with regard to the server 20 may be performed locally by one or more devices 10 or by another device within a local network that includes one or more devices 10.

In some embodiments, remote server 20 may contain logic to analyze point cloud data at various granularities of space. This concept may be understood as a virtual space—a digital representation of a physical space—with different virtual spaces existing within a hierarchy of perception. To illustrate, trajectories of objects or people within any of a number of geographic spaces may be determined, such as a campus, a building, a floor, a room, or a cubicle, each subsequent space being a subset of the larger physical space before it so as to fit within in. Additionally, based on the determined trajectories, an account occupancy count for each defined virtual space can be determined. A virtual space may be defined for each of these physical spaces, creating a set of "nested" virtual spaces. A user (such as a business owner) interested in tracking occupancy and trajectories through any or all of those geographical spaces may then be able to access real-time data thereof by selecting the corresponding virtual space, after which the trajectories of objects and associated timestamp is displayed/transmitted. If desired, the user may also display the occupancy count for a given virtual space in a similar manner.

Similarly, in addition to particular physical spaces, remote server 20 may contain logic to generate occupancy and trajectory data within defined logical spaces, such as an organizational grouping of offices/cubicles (e.g. a department or team space), or a subset of rooms not necessarily contiguous or located within a single physical space. In one embodiment, the data is distributed by the remote server 20 via an API so as to be accessible from a mobile or other computing device 25. Any given device 10 is typically not aware of any grouping or classification it may belong to, and meaningful grouping of any of devices 10 may be performed by the remote server 20.

Figure 7:
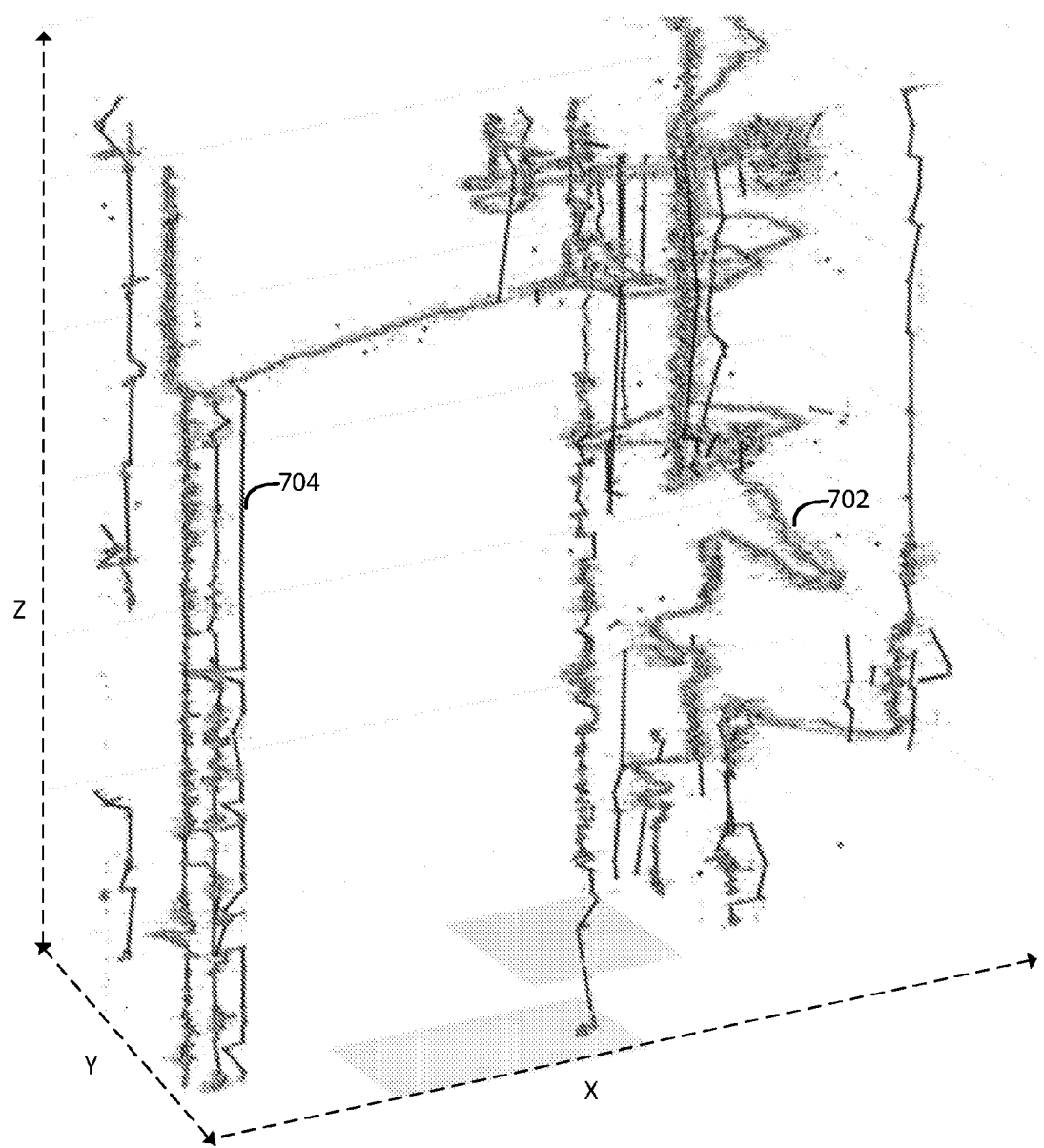
FIG. 7 depicts exemplary tracking data generated by the positional sensing system, in accordance with some embodiments of the present disclosure.

The aggregated count data and/or trajectory data may be presented, with low latency (e.g., typically less than a few seconds latency), to a user via an API so as to be accessible via an application, software, or other user interface. The information may be presented to a user interface at various hierarchical slices of virtual spaces. In some embodiments, a user of device 25 may request, from server 20, aggregated count data for a particular virtual space for a defined period of time (e.g., one day, one week, one month) and may receive, in response, an interface displaying a total count for the defined period of time. Similarly, a user of device 25 may request, from server 20, trajectory data for a particular virtual space for a defined period of time (e.g., one day, one week, one month) and may receive, in response, an interface displaying a total each identified object and its associated trajectory for the defined period of time (for example, as shown in FIG. 7).

In some embodiments, the user may obtain from the server trending or hierarchical people count statistics. For example, a user may be able to access a trend of occupancy data over the course of a day on an hourly basis. In one embodiment, the server 20 may have one or more repositories of historical occupancy data collected for one or more devices 10 from which analysis and/or reporting may be done in response to a user request.

Remote server 20 may in some embodiments communicate bi-directionally with one or more devices 10. For instance, remote server 20 may receive periodic updates from a device 10 with status information, such as a MAC address (or other network information) or other information regarding the devices' health and connectivity. The remote server 20 may respond thereto, and may also be capable of querying a device 10 as to that same type of data, or providing operational instructions such as, e.g., instructions to reboot, to update its software, or perform network commissioning process (e.g., blink a light or communicate its network information via Bluetooth or wireless communication), or to kick off/stop data capture operation.

As described above, data capture can be performed asynchronously, with event data being captured and processed at cyclical or irregular times. For instance, in retail establishments, there may be little or no data captured after closing hours of the business or when the doors are locked. As a result, there may be predictable times of day at which time the computing capabilities of the device 10 are expected to be unused or underutilized. In this regard, application processor 342, AI processor 344, and map processor 346 may only have processing tasks to perform when phase data is being captured by the sensor 232. Accordingly, in one embodiment, spare computing resources of the device 10 and server 20 are identified, and during periods of relative inactivity, the spare computing resources are used for tasks unrelated to the capture and processing of depth data. For example, the spare computing resources of application processor 342, AI processor 344, and map processor 346 may be used as additional compute for training of the machine learning elements of the AI processor 344, or the update of related algorithms and/or software/firmware. Additionally, spare resources may be used for wholly unrelated tasks to serve the needs of other devices connected to the wireless network. In support of these functions, cached data may be stored, for example, in any of memories 343, 345, and 347. By these means, all components of positional sensing system 1 are network-enabled and may be taken together or separately to act as a data center. This may reduce bandwidth and latency requirements for other devices, and may improve security where data processing performed by devices other than the positional sensing devices 10 and server 20 should be restricted to a premise on which device 10 is located.

In some embodiments, in addition to the phase data, the sensor app processor 236 may also transmit telemetry data to the application processor 342, including, e.g., temperature data, CPU/memory/disk status, commands executed, and the like. In some embodiments, the telemetry data is typically sent at periodic intervals (e.g., every 10 seconds), however, in other embodiments, it may be sent only upon request from the server 20, or with every instance of data capture.

Figure 4:
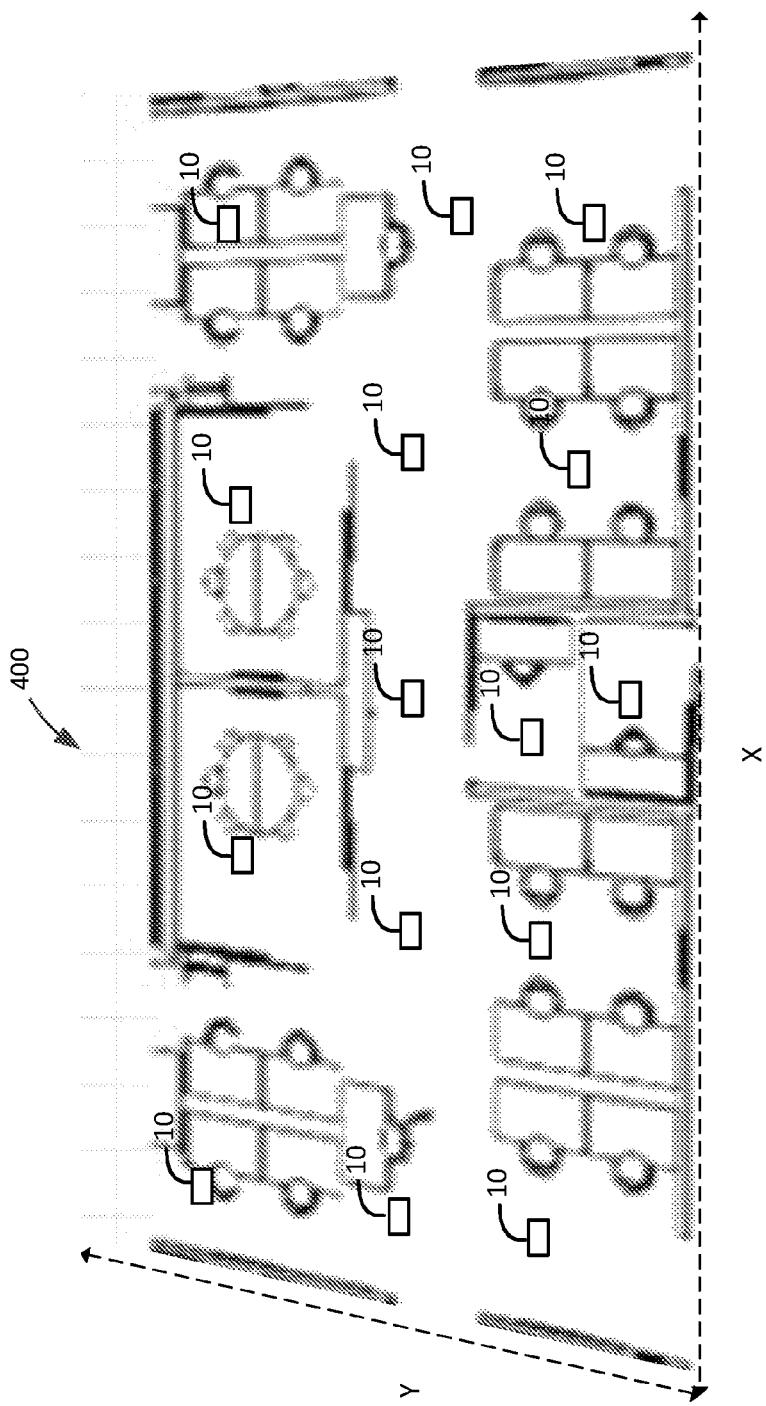
FIG. 4 depicts a stored map and positions of a plurality of positional sensing devices, in accordance with some embodiments of the present disclosure.

FIG. 4 depicts a stored map 400 and positions of a plurality of positional sensing devices, in accordance with some embodiments of the present disclosure. The primary function of device 10 is to monitor the positions of people as they travel though the environment being monitored. This includes the ability to determine directionality of movement, differentiate between multiple moving objects and correctly determine trajectories of each object, and to disregard non-human subjects, such as animals, objects, door swings, shadows, and the like. The margin of error in performing these tasks should be relatively low. In some embodiments, the margin of error may be less than 1%. As shown in FIG. 4, stored map 400 may represent the environment which the position sensing system 1 is configured to monitor. The map 400 may include data including the position (e.g., using X, Y coordinates) of features of the environment, such as doors, walls, and other objects that may occlude the monitored area of one or more positional sensing devices 10. Additionally, the map 400 may include positional data (e.g., X, Y coordinates) for each positional sensing device 10. Using the coordinates of each positional sensing device 10 stored in map 400, the server 20 may aggregate the positional data captured by each positional sensing device 10 to track objects that move between the field of view of various positional sensing devices 10. Additionally, server 20 may be configured to identify the position and trajectory of an object even when it is occluded from a positional sensing device 10 by a feature of the environment by utilizing data captured from an adjacent positional sensing device 10 and/or the data stored on map 400. For example, if an adjacent positional sensing device 10 has an overlapping field of view that captures the object, the server 20 can continue to identify the position and trajectory of such an object as it passes the occluding feature. In some embodiments, even when no positional sensing device 10 can detect an object being an occluding feature, the server can use AI techniques to inference the position and trajectory of the object using the stored position of the occluding feature within map 400 and by using a reward function to connect the position and trajectory of the object prior to becoming occluded and after the object is no longer occluded by the feature. Similarly, data stored in map 400 can be used to filter out spurious signals. For example, map 400 can store the position of walls within the environment, and if a respective positional sensor identifies an object that is beyond an occluding wall, such data can be ignored (e.g., filtered out) by server 20 when aggregating and clustering positional data from the various positional sensing devices 10.

Figure 5:
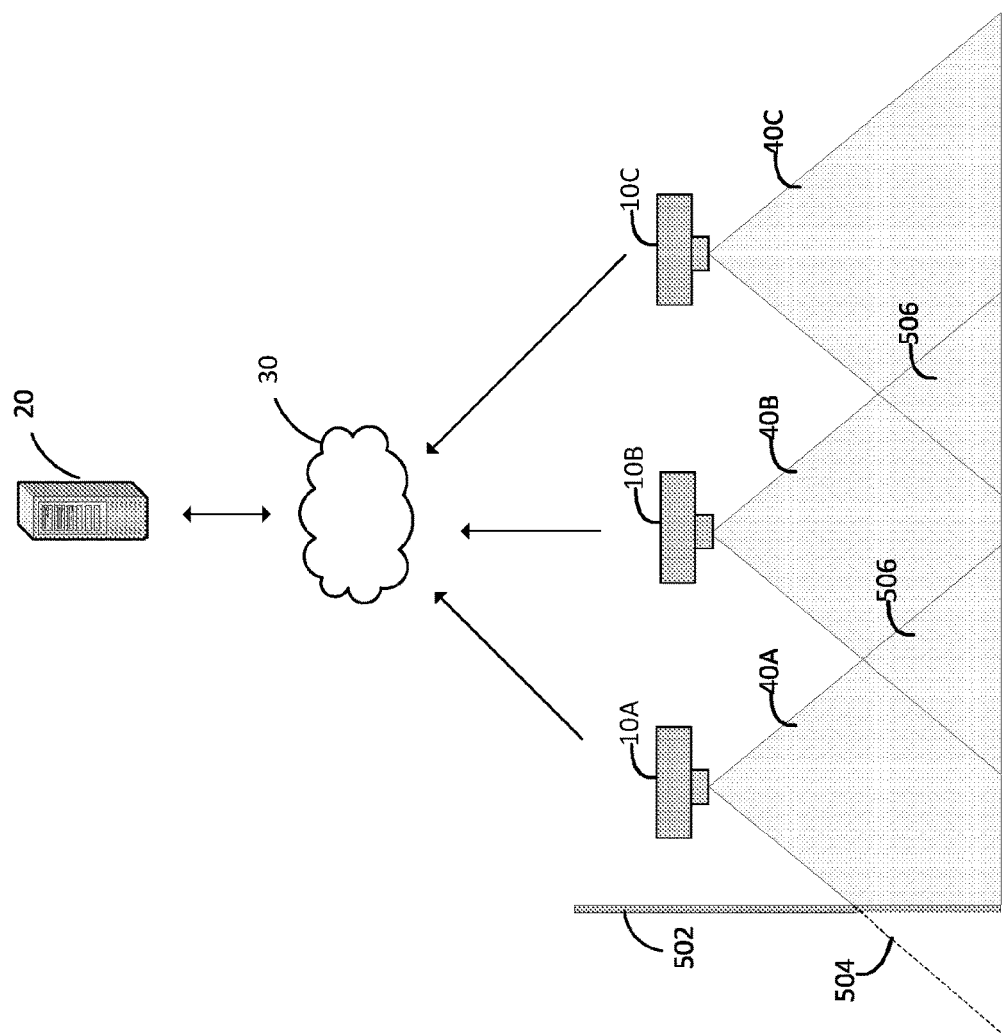
FIG. 5 depicts a plurality of positional sensing devices in which at least a portion of the monitored area is occluded, in accordance with some embodiments of the present disclosure.

FIG. 5 depicts a plurality of positional sensing devices 10 in which at least a portion of the monitored area is occluded, in accordance with some embodiments of the present disclosure. As shown, positional sensing devices 10A, 10B, and 10C are deployed to monitor an area and having respective field of views 40A, 40B, and 40C. An occluding wall 502 partially occludes field of view 40A of positional sensor 10A. Note that Field of view 40A and field of view 40B have an overlapping area 506. Similarly, field of view 40B and field of view 40C have a similar overlapping area 506. Each of the positional sensing devices 10 are connected to server 20 via network 30. In the case that positional sensor device 10A generates positional data that indicates a position within occluding area 504, the server 20 may filter out such positional data. Positional data may be transmitted to sever 20 with included XY coordinates, which can be cross referenced with coordinates of occluding feature 502 stored by map processor 346. If map processor 346 determines that the XY coordinates of the occluding feature is located between the XY coordinates of the positional sensing device 10A and the XY coordinates associated with the positional data, the map processor 346 may determine that such positional data is spurious and may filter it out from the aggregated positional data. In other words such positional data may not be used to determine aggregated positional data of all monitored objects within the environment.

Figure 6:
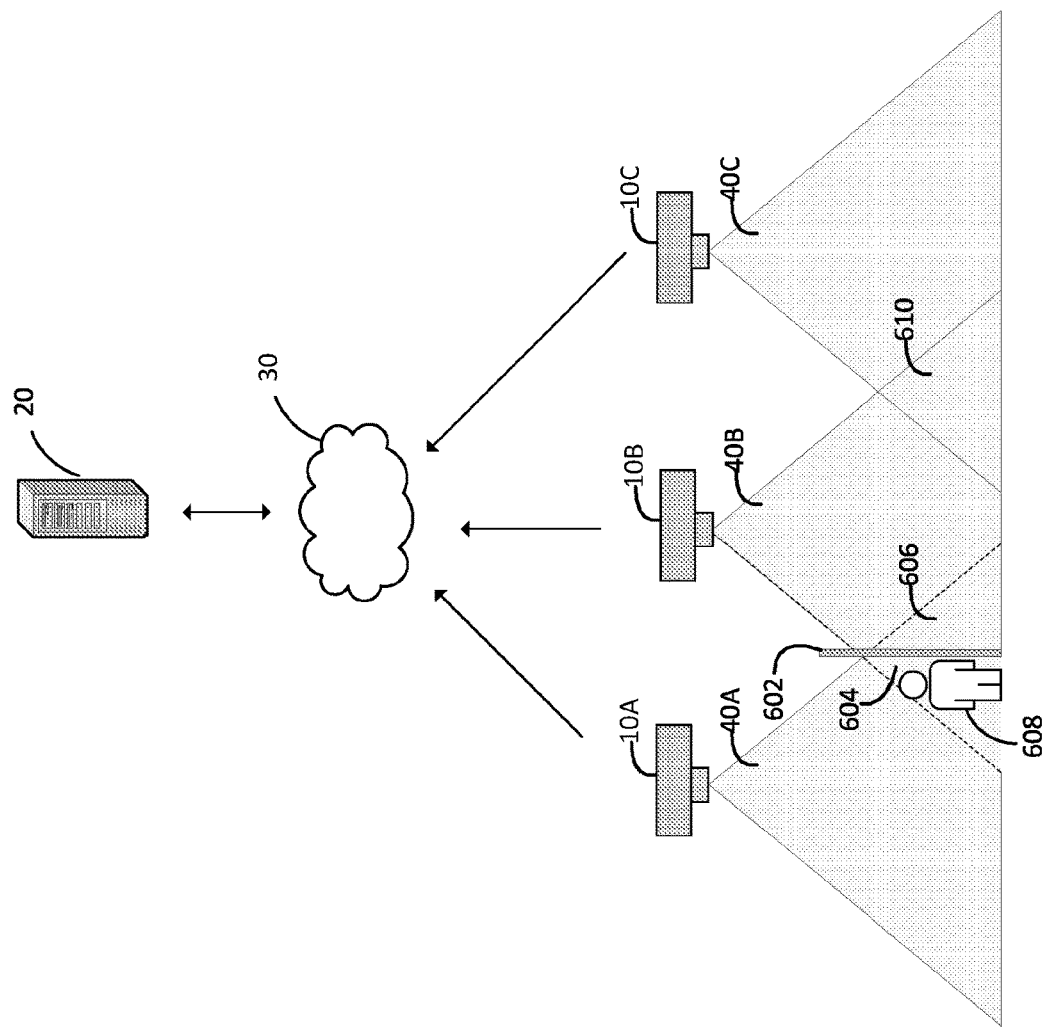
FIG. 6 depicts a plurality of positional sensing devices in which at least a portion of the monitored area is occluded from a first positional sensing device, but not a second positional sensing device, in accordance with some embodiments of the present disclosure.

FIG. 6 depicts a plurality of positional sensing devices in which at least a portion of the monitored area is occluded from a first positional sensing device, but not a second positional sensing device, in accordance with some embodiments of the present disclosure. As shown, positional sensing devices 10A, 10B, and 10C are deployed to monitor an area and having respective field of views 40A, 40B, and 40C. An occluding feature 602 partially occludes field of view 40A of positional sensor 10A and field of view 40B of positional sensor 10B. Within the overlapping area between field of view 40A and 40B, there is a partially occluded area 604 which is not hidden from field of view 40A but is hidden from field of view 40B. Conversely, partially occluded area 606 is not hidden from field of view 40B but is hidden from field of view 40A. In one example, a person 608 can be positioned within partially occluded area 604 such that person 608 is visible to positional sensor 10A, but not positional sensor 10B. Accordingly, positional data associated with person 608 can be measured by positional sensing device 10A and person 608 can be tracked even though positional sensor 10B is occluded from observing person 608. In another example, map data 400 stored by map processor 346 can be used to enhance positional data determined by one or more positional sensing device 10. Map 400 can include XY coordinates for doorways between a first room and a second room of a monitored environment. Should positional data be generated that shows person 608 moving between the first and second room, but not through a doorway, the map processor 346 may adjust the XY coordinates associated with the positional data of person 608 such that person 608 is determined to be moving between the first room and the second room through XY coordinates associated with the doorway stored by map processor 346.

FIG. 7 depicts exemplary tracking data generated by the positional sensing system, in accordance with some embodiments of the present disclosure. FIG. 7 depicts an XYZ coordinate system that includes positional data over time for objects monitored by the positional sensor system 1. The X and Y axes correlate to XY coordinates stored as part of map 400 associated with the area being monitored. The Z axis represents time, such that the XYZ coordinate system shows the change in position of objects being monitored over time.

Positional data from the positional sensing devices 10 is aggregated by the compute module 340 of sever 20. For each timestamp, the compute module 340 determines whether a positional data along the Z axis is associated with the same object. Compute module 340 utilizes a first algorithm (e.g., a reward function) to connect point clouds together that are associated with a respective object to form tracklets 702. Tracklets 702 are associated with a respective object (e.g., a person) moving throughout the monitored environment. For example, the tracklet 702 represents an object (person) moving along the Y dimension over time, as measured by the Z axis. The first reward function can be optimized to identify moving objects. For example, the first reward function can be configured to identify point clouds having a threshold number of associated points. It should be understood that point clouds include more associated points when the monitored object is in motion. Therefore the first reward function can be configured to identify point clouds of a sufficient size, which are correlated to objects in motion.

However, in certain situations, a monitored person may temporarily cease moving. For example, a person may travel to a conference room and subsequently take a seat within the conference room for a meeting. After a specified time sitting, the same person may stand and leave the conference room for another location within the environment. The first reward function that is optimized to identify point clouds with more than a threshold number of points may not be effective in monitoring the position of a relatively stationary person, such as a person sitting down in a conference room. Accordingly, compute module 340 may utilize a second algorithm (e.g., reward function) which may be optimized to identify relatively stationary objects. The second reward function may be optimized for point clouds with less than a threshold number of points within the point cloud, which represents objects that are associated with little to no movement. For example, phased array sensor may only detect small movements of a person's arms while the person remains sitting/relatively stationary, and the second reward function may be optimized to detect such small movements which are correlated to point clouds having less than a threshold number of points. Lines 704 can represent objects identified by the second reward function. As shown in FIG. 7, lines 704 can connect tracklets 702 thereby forming full trajectories for each detected object within the monitored area over time. It should be understood that the second algorithm (e.g., reward function) is also configured to connect tracklets when there are no detected points within the point cloud. For example, a person seated still and standing in place with little to no movement may result in no positional data being generated corresponding to the position and trajectory of that person. The second reward function can connect tracklets associated with a respective object generated by the first reward function even when separated by periods of no positional data being detected for the non-moving object.

Figure 8:
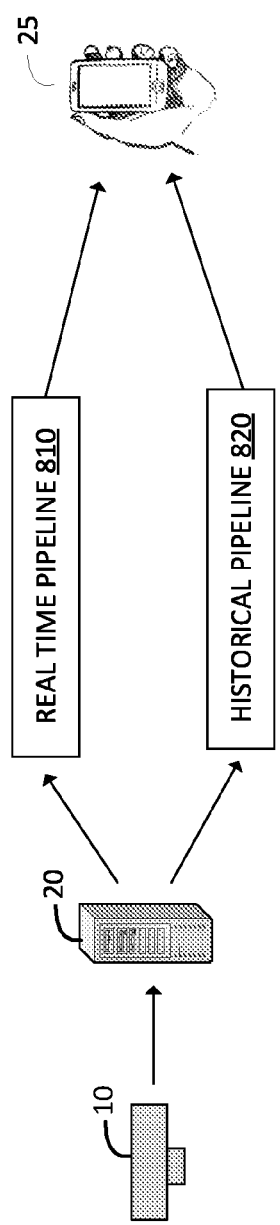
FIG. 8 depicts data flow for generating tracking data by the positional sensing system, in accordance with some embodiments of the present disclosure.

FIG. 8 depicts data flow for generating tracking data by the positional sensing system, in accordance with some embodiments of the present disclosure. As shown, server 20 may be configured to generate tracking data using either real time pipeline 810 or historical pipeline 820. Real time pipeline 810 allows for a user of device 25 to request real time tracking data collected from the positional sensing devices 10 in substantially real time. As used herein, substantially real time means approximately 5 minutes or less after the data is being collected, the tracking data becomes available for review and can be transmitted to the device 25 via an API request to the server 20. The real time pipeline 810 may not provide tracking data that is as accurate as the data that can be provided via historical pipeline 820. In some embodiments, real time pipeline 810 may utilize the first reward function but not the second reward function in order to provide tracking (e.g., positional data over time) data in substantially real time at the cost of being less optimized to connect tracklets for a respective object when separated by periods of the object having relatively little to no motion.

In an exemplary embodiment, tracking data from historical pipeline 820 can become available to be transmitted to device 25 approximately 1 hour after being collected. In another example embodiment, the tracking data from historical pipeline 820 can become available to device 25 approximately 24 hours after being collected. In contrast to tracking data generated as part of real time pipeline 810, tracking data that is generated as part of historical pipeline 820 can have improved accuracy, because positional data is chunked into discrete time portions. Accordingly, the positional data associated with any given time portion can be compared to an immediately previous time portion and immediately subsequent time portion, and compute module 340 may utilize one or more algorithms to efficiently match the positions of identified objects such that their trajectories are continuous over the chunked time portions. In this manner, tracking data generated via the historical pipeline 820 can have a greater accuracy than the tracking data generated by the real time pipeline 810, at the sacrifice of being delayed in its availability to be transmitted to a device 25 for review by a user of the positional sensing system 1. In some embodiments, historical pipeline 820 can utilize both first reward function for tracking moving objects and second reward function for tracking relatively static objects, which increases the accuracy of the historical pipeline 820 with respect to real time pipeline 810. For example, the historical pipeline 820 is able to detect an object (e.g., a person) enter a space clearly and then at a later time detect the object leaving the space. The historical pipeline 820 can connect the tracklets for the object across the time the object remained relatively static in the space with a high confidence even though there is little to no positional data for that object during the time the object remains relatively static.

Figure 9A:
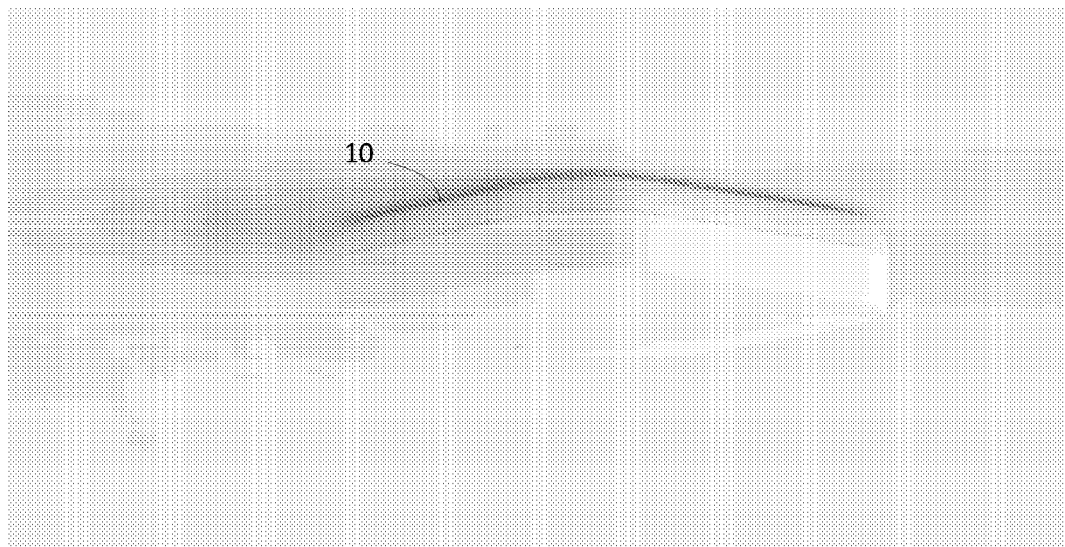
FIG. 9A is a diagram of a positional sensing device in accordance with some embodiments of the present disclosure.
Figure 9B:
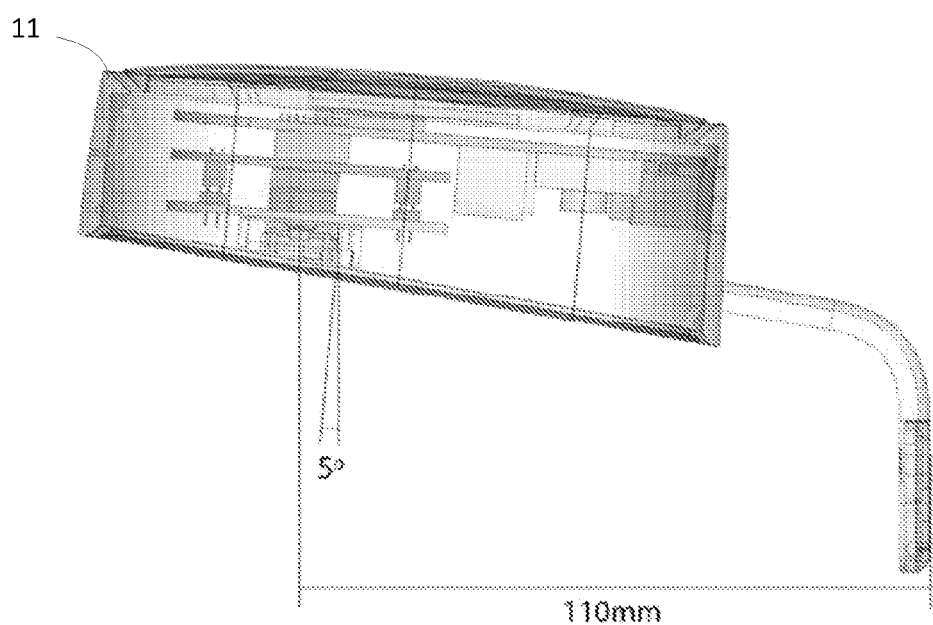
FIG. 9B is a diagram of a depth sensing device in accordance with some embodiments of the present disclosure.

FIG. 9A is a diagram of a positional sensing device 10 and FIG. 9B is a diagram of a depth sensing device 11. In contrast with depth sensing device 11, positional sensing device 10 may be positioned on a ceiling surface parallel to the ceiling surface. In some embodiments, depth sensing device can be configured to be positioned at an angle relative to the wall against which the depth sensing device 10 is mounted, e.g., at a 5° angle or a value approximate thereto, though other angles may be used as appropriate. In contrast to the positional sensing device 10, depth sensing device 11 can be placed on a wall surface approximate an entryway or threshold. In some embodiments, the depth sensing device can be placed at a distance of at least 110 mm from the wall, although other distances are possible in other embodiments.

By means of the methods and systems described above, a real-time, accurate, and highly-scalable solution for tracking people's trajectories and determining occupancy counts can be implemented, while still remaining conscious of privacy and retaining anonymity of the people it monitors. Unlike optical cameras that collect images that must later be processed and/or anonymized, the systems and methods herein are anonymized from the start, as they do not store personally-identifiable information. The positional sensing devices track objects within its field of view in an anonymous manner such that stored data cannot be correlated to the identity of any specific person being monitored. The system gathers anonymous data, meaning the system has no way to determine the identity, gender, facial features, or other recognizable information of individual people. Accordingly, an accurate and anonymous trajectories of people can be provided to be accessible via a cloud-based interface. Businesses and customers may have access to real-time, historical, trajectory data, which can also be used to determine occupancy of monitored areas, which may allow businesses and customers to optimize their management and schedules in view of that data. Further, the data can be viewed at different levels of granularity, providing for highly-flexible analysis thereof.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system comprising:
   a first positional sensing device configured to monitor a first area comprising: a pulse generator for generating pulses;
   a sensor for measuring reflections of the pulses generated by the pulse generator and reflected from one or more detected objects;

a first module for determining positional data for the one or more detected objects based on the reflections;
a server remote from the first positional sensing device wherein the server is communicatively coupled to the first positional sensing device via a network, the server being configured to:
receive the positional data for the one or more detected objects from the first positional sensing device; and
determine a trajectory for each of the one or more detected objects through the first area based on the positional data.

2. The system of 1, wherein the first module is further configured to determine timestamp data for the one or more detected objects based on the reflections and wherein the server is further configured to:
cluster the positional data into a plurality of clusters for each point of time indicated by the timestamp data, wherein each cluster represents a detected object of the one or more detected objects;
generate tracklets that track the position of each cluster of the plurality of clusters over each point of time indicated by the timestamp data; and
determine a trajectory for each of the one or more detected objects by connecting tracklets together that are associated with a same detected object.

3. The system of 2, wherein:
the server is configured to generate tracklets based on a first reward function optimized for tracking moving objects; and
the server is configured to connect tracklets based on a second reward function optimized for tracking relatively static objects.

4. The system of 3, further comprising a second positional sensing device configured to monitor a second area that is different from the first area;
wherein the server is further configured to determine a trajectory of a first detected object detected by both the first positional sensing device and the second positional sensing device through a first area and a second area.

5. The system of 2, further comprising a second positional sensing device configured to monitor a second area that is overlapping with the first area;
wherein the server is further configured to determine whether a respective object is the same detected object based in part on comparing positional data from the first positional sensing device to the positional data from the second positional sensing device.

6. The system of 4, wherein the server is further configured to store a floor map of the first area and the second area, wherein the first area comprises a first room and the second area comprises a second room different from the first room, and the server is configured to determine an occupancy value for the first area and the second area based at least in part on the determined trajectories for each of the one or more detected objects and the floor map.

7. The system of 6, wherein the occupancy value is determined in substantially real time.

8. The system of 1, wherein in response to the first positional sensing device not detecting any objects for a predetermined threshold of time, the server determines that the occupancy value of the first area is zero.

9. The system of 5, wherein:
the server is further configured to store a floor map of the first area and the second area; the floor map comprises one or more occluding objects; and
the server is configured to determine the trajectory of a first detected object that is occluded from the first positional sensing device by the one or more occluding objects but not occluded from the second positional sensing device by the one or more occluding objects.

10. The system of 4, wherein:
the server is further configured to store a floor map of the first area and the second area; the first area comprises a first room and the second area comprises a second room;
the floor map comprises a doorway between the first room and the second room; and the server is configured to determine that the first detected object passes through the
doorway between the first room and the second room.

11. The system of 3, wherein the server is further configured to:
aggregate positional data and timestamp data for the one or more detected objects; chunk the positional data and timestamp data into a plurality of time portions; and connect tracklets associated with a first detected object based in part on comparing
positional data of respective time portions of the plurality of time portions.

12. A system comprising:
a first positional sensing device configured to monitor a first area comprising: a pulse generator for generating pulses;
a sensor for measuring reflections of the pulses generated by the pulse generator and reflected from one or more detected objects;
a first module for determining positional data for the one or more detected objects based on the reflections;
a server remote from the first positional sensing device comprising wherein the server is communicatively coupled to the first positional sensing device via a network, the server being configured to:
receive the positional data for the one or more detected objects from the first positional sensing device; and
determine a trajectory for each of the one or more detected objects through the first area based on the positional data;
cluster the positional data into a plurality of clusters for a plurality of time points, wherein each cluster represents a detected object of the one or more detected objects;
generate tracklets that track the position of each cluster of the plurality of clusters over the plurality of time points; and
determine a trajectory for each of the one or more detected objects by connecting tracklets together that are associated with a same detected object.

13. The system of claim 12, wherein:
the second module is configured to generate tracklets based on a first reward function optimized for identifying moving objects; and
the third module is configured to connect tracklets based on a second reward function optimized for identifying relatively static objects.

14. The system of claim 13, further comprising a second positional sensing device configured to monitor a second area that is different from the first area;
wherein the server is further configured to determine a trajectory of a first detected object detected by both the first positional sensing device and the second positional sensing device through a first area and a second area.

15. The system of 12, further comprising a second positional sensing device configured to monitor a second area that is overlapping with the first area;

wherein the server is further configured to determine whether a respective object is the same detected object based in part on comparing positional data from the first positional sensing device to the positional data from the second positional sensing device.

16. A method comprising:
receiving, at a server from one or more positional sensing devices, positional data for one or more objects detected within a physical space;
determining by the server, trajectories for each of the one or more objects;
comparing, by the server, the trajectories for each of the one or more objects to stored map data, the stored map data comprising a plurality of rooms; and
determining an occupancy value for each room of the plurality of rooms based on the comparison.

17. The method of claim 16, wherein determining the trajectories of the one or more objects comprises:
determining timestamp data associated with the positional data;
clustering the positional data into a plurality of clusters for each point of time indicated by the timestamp data, wherein each cluster represents a detected object of the one or more detected objects;
generating tracklets that track the position of each cluster of the plurality of clusters over each point of time indicated by the timestamp data; and
determining the trajectory for each of the one or more detected objects by connecting tracklets together that are associated with a same detected object.

18. The method of claim 16, wherein responsive to not detecting any objects within a respective room of the plurality of rooms for a predetermined time period, the server determines that the occupancy of the respective room is zero.

19. The method of claim 16, wherein the occupancy values are determined in substantially real-time.

20. The method of claim 17, further comprising:
aggregating, by the server, the positional data and the timestamp data;
chunking the positional data into a plurality of time portions based on the timestamp data;
and
connecting tracklets associated with a first detected object based in part on comparing positional data from respective time portions of the plurality of time portions.

* * * * *